(12) United States Patent
Munavalli

(10) Patent No.: US 12,271,703 B2
(45) Date of Patent: Apr. 8, 2025

(54) REINFORCEMENT LEARNING TECHNIQUES FOR DIALOGUE MANAGEMENT

(71) Applicant: PayPal, Inc., San Jose, CA (US)

(72) Inventor: Rajesh Virupaksha Munavalli, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 799 days.

(21) Appl. No.: 17/489,356

(22) Filed: Sep. 29, 2021

(65) Prior Publication Data

US 2022/0108080 A1 Apr. 7, 2022

Related U.S. Application Data

(60) Provisional application No. 63/086,715, filed on Oct. 2, 2020.

(51) Int. Cl.

| | |
|---|---|
| *G06F 40/35* | (2020.01) |
| *G06N 3/08* | (2023.01) |
| *G06F 16/3329* | (2025.01) |
| *G10L 15/06* | (2013.01) |
| *G10L 15/22* | (2006.01) |

(52) U.S. Cl.
CPC ............ *G06F 40/35* (2020.01); *G06N 3/08* (2013.01); *G06F 16/3329* (2019.01); *G10L 15/063* (2013.01); *G10L 15/22* (2013.01)

(58) Field of Classification Search
CPC .... G10L 15/22; G10L 15/063; G06F 16/3329
See application file for complete search history.

(56) References Cited

U.S. PATENT DOCUMENTS

| | | | | |
|---|---|---|---|---|
| 9,799,348 | B2 * | 10/2017 | Paul | ....................... G10L 15/075 |
| 2016/0351074 | A1 * | 12/2016 | Paul | ....................... A61B 5/4803 |
| 2018/0233143 | A1 * | 8/2018 | Papangelis | .............. G10L 15/16 |

(Continued)

OTHER PUBLICATIONS

Higashinaka, et al. "Unsupervised Clustering of Utterances using Non-parametric Bayesian Methods," Interspeech, 2011. (Year: 2011).*

(Continued)

*Primary Examiner* — Feng-Tzer Tzeng
(74) *Attorney, Agent, or Firm* — Kowert, Hood, Munyon, Rankin & Goetzel, P.C.; Dean M. Munyon

(57) ABSTRACT

Techniques are disclosed herein relating to using reinforcement learning to generate a dialogue policy. A computer system may perform an iterative training operation to train a deep Q-learning network (DQN) based on conversation logs from prior conversations. In various embodiments, the DQN may include an input layer to receive an input value indicative of a current state of a given conversation, one or more hidden layers, and an output layer that includes a set of nodes corresponding to available responses. During the iterative training operation, the disclosed techniques may analyze utterances from a conversation log and, based on the utterances, use the DQN to determine appropriate responses. Reward values may be determined based on the selected responses and, based on the reward values, the DQN may be updated. Once generated, the dialogue policy may be used by a chatbot system to guide conversations with users.

20 Claims, 9 Drawing Sheets

(56) References Cited

U.S. PATENT DOCUMENTS

2019/0130904 A1* 5/2019 Homma ................. G06N 3/088

OTHER PUBLICATIONS

A.I. Wiki; A Beginner's Guide to Deep Reinforcement Learning; https://wiki.pathmind.com/deep-reinforcement-learning, 18 pages. [Retrieved Sep. 26, 2020].
Serban et al., "A Deep Reinforcement Learning Chatbot," arXiv:1709.02349v1 [cs.CL] Sep. 7, 2017, 35 pages.
Peng et al., "Composite Task-Completion Dialogue Policy Learning via Hierarchical Deep Reinforcement Learning," arXiv:1704.03084v3 [cs.CL] Jul. 22, 2017, 12 pages.
Yuan et al., "Counting to Explore and Generalize in Text-based Games," European Workshop on Reinforcement Learning 14 (Oct. 2018), 16 pages.
Kumar, "Deep Averaging network in Universal sentence encoder," https://medium.com/tech-that-works/deep-averaging-network-in-universal-sentence-encoder; Aug. 28, 2019, 5 pages. [Retrieved Sep. 19, 2020].
Iyyer et al., "Deep Unordered Composition Rivals Syntactic Methods for Text Classification," Proceedings of the 53rd Annual Meeting of the Association for Computational Linguistics and the 7th International Joint Conference on Natural Language Processing, Jul. 2015, pp. 1681-1691.
Li et al., "Deep Reinforcement Learning for Dialogue Generation," arXiv:1606.01541v4 [cs.CL] Sep. 29, 2016, 11 pages.
Sankar et al., "Deep Reinforcement Learning for Modeling Chit-Chat Dialog With Discrete Attributes," Proceedings of the SIGDial 2019 Conference, pp. 1-10.
Lewis et al., "Deal or No Deal? End-to-End Learning for Negotiation Dialogues," Proceedings of the 2017 Conference on Empirical Methods in Natural Language Processing, pp. 2433-2443.
Statt, "Facebook confirms it's working on an AI voice assistant for Portal and Oculus products," https://www.theverge.com/2019/4/17/18412757/facebook-ai-voice-assistant-portal-oculus-vr-ar-products; Apr. 17, 2019, 1 page. [Retrieved Sep. 27, 2020].
Causevic "A Structural Overview of Reinforcement Learning Algorithms," https://towardsdatascience.com/an-overview- pf-classic-reinforcement-learning-algorithms-part-1-f79c8b87e5af; Jun. 17, 2020, 18 pages.
Yuan et al., "Interactive Language Learning by Question Answering," arXiv:1908.10909v1 [cs.CL] Aug. 28, 2019, 18 pages.
Yuan et al., "Interactive Machine Comprehension with Information Seeking Agents," arXiv:1908.10449v3 [cs.CL] Apr. 16, 2020, 12 pages.
Gao et al., "Neural Approaches to Conversational AI—Question Answering, Task-Oriented Dialogues and Social Chatbots," arXiv:1809.08267v3 [cs.CL] Sep. 10, 2019, 95 pages.
Sutton et al., "Policy Gradient Methods for Reinforcement Learning with Function Approximation," Advances in Neural Information Processing Systems 12, pp. 1057-1063.
Sutton et al., "Reinforcement Learning: An Introduction," Second edition, in progress, The MIT Press, copyright 2014, 2015, 352 pages.
Côte et al., "TextWorld: A Learning Environment for Text-based Games," arXiv:1806.11532v2 [cs.LG] Nov. 8, 2019, 29 pages.
Dhingra et al., "Towards End-to-End Reinforcement Learning of Dialogue Agents for Information Access," arXiv:1609.00777 Apr. 20, 2017, 12 pages.
Bots, Voice Enabled Chatbots Vs.Messenger Bots: Everything You Need to Know, Oct. 18, 2018, 7 pages.
Shyalika, "A Beginners Guide to Q-Learning," towards data science, Nov. 14, 2019, 11 pages.
Karagiannakos, "Deep Q Learning and Deep Q Networks," AI Summer, Oct. 2008, 6 pages.
Gupta, "Deep Q-Learning," GeeksforGeeks, Last Updated: Jun. 18, 2019, 3 pages.
Mnih et al., "Human-level control through deep reinforcement learning," Letter, doi: 10.1038/nature14236; Feb. 26, 2015, vol. 518, Nature, 13 pages.
Introduction to RL and Deep Q Networks, TensorFlow Agents, 2021; https://www.tensorflow.org/agents/tutorials/0_intro_rl; 4 pages. [Retrieved Aug. 18, 2021].
Chen et al., "Optimized Computation Offloading Performance in Virtual Edge Computing Systems via Deep Reinforcement Learning," arXiv:1805.06146v1 [cs.LG] May 16, 2018, 32 pages.
Mnih et al., "Playing Atari with Deep Reinforcement Learning," NIPS Deep Learning Workshop 2013, Machine Learning (cs.LG), arXiv:1312.5602, Thu, Dec. 19, 2013, 9 pages.
Karagiannakos, "Q-targets, Double DQN and Dueling DQN," AI Summer, Oct. 14, 2018, 5 pages.
Universal Sentence Encoder, TensorFlow Hub, last updated Jul. 29, 2021, 7 pages.
Cer et al., "Universal Sentence Encoder," arXiv:1803.11175v2 [cs.CL] Apr. 12, 2018, 7 pages.

* cited by examiner

REINFORCEMENT LEARNING TECHNIQUES FOR DIALOGUE MANAGEMENT

CROSS-REFERENCE TO RELATED APPLICATIONS

The present application claims priority to U.S. Prov. Appl. No. 63/086,715, filed Oct. 2, 2020, which is incorporated by reference herein in its entirety.

BACKGROUND

Technical Field

The present disclosure relates to machine learning and, in particular, to reinforcement learning techniques for dialogue management.

Description of Related Art

Chatbots may be used in various contexts. For example, a chatbot may be hosted on a website to assist users with technical issues. In a typical instance, a user may initiate a conversation with the chatbot by providing a statement to an input mechanism of the chatbot (e.g., an instant messaging-style chat window) and, based on the user's statements, the chatbot will select a response designed to meet the user's objective.

Existing chatbot systems suffer from various technical shortcomings. For instance, most existing chatbot systems use "dialogue trees" to guide the conversational flow, where these dialogue trees are hand-coded and require a significant amount of time and effort on the part of a human agent to construct the dialogue tree. For example, to generate a portion of a dialogue tree for a single issue, a human user must review dialogues from prior conversations relating to this issue and design an optimal structure for the dialogue tree so as to elicit the desired information from the user in a quick and effective manner. This process must then be repeated to create a dialogue flow for each of the possible issues (e.g., 100s or 1000s) that the chatbot is designed to handle, for each of the different channels (e.g., instant messaging-style chat window, SMS, email, voice-to-text, etc.) and in each of the different languages supported. Accordingly, existing chatbot systems require a significant amount of user time and effort to generate and maintain, and may quickly become outdated as new issues arise, decreasing the effectiveness of the chatbot.

DETAILED DESCRIPTION

Figure 1:
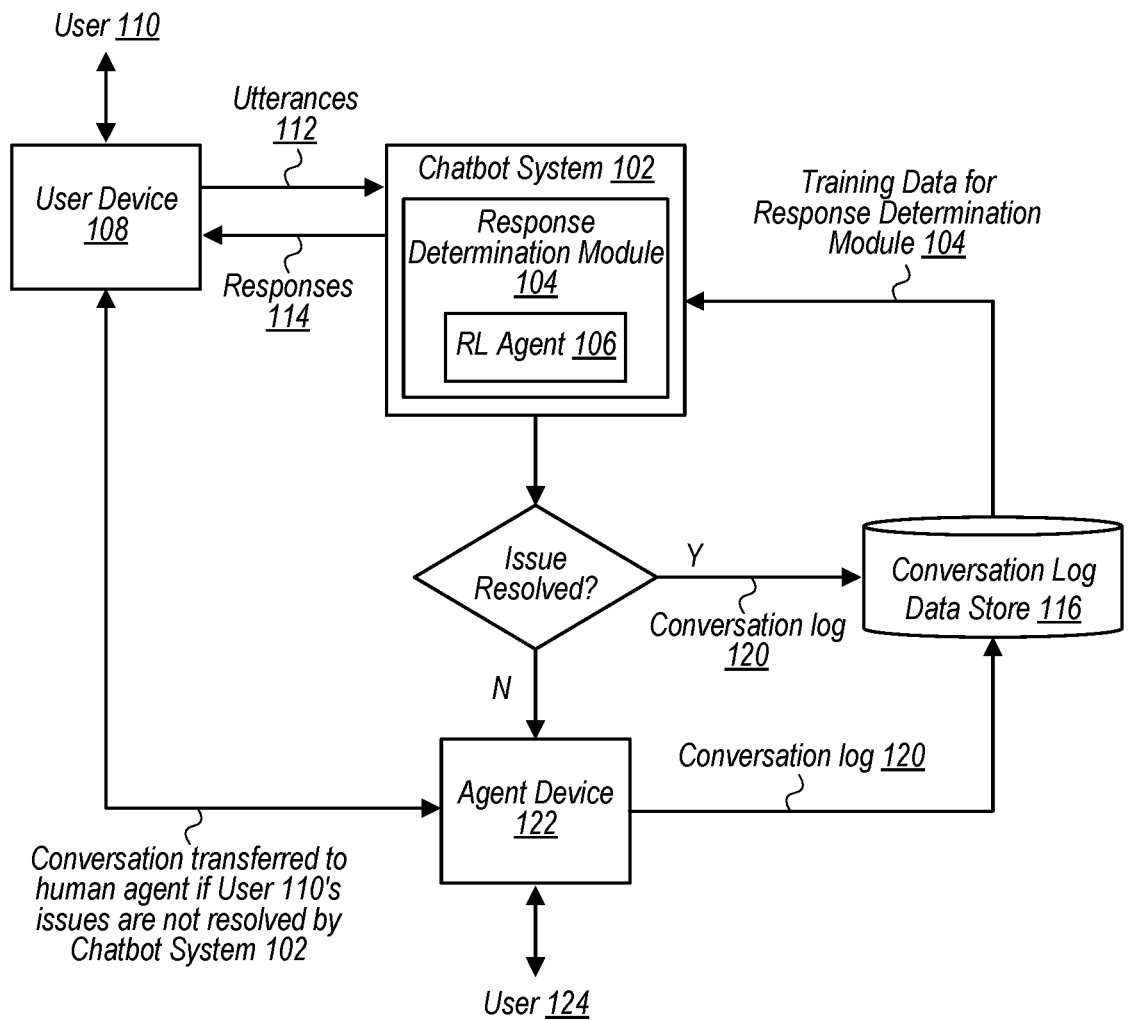
FIG. 1 is a block diagram illustrating an example chatbot system with a response determination module that includes a reinforcement learning agent, according to some embodiments.

A "chatbot" is a software application designed to engage in a conversation with a human user. Chatbots may be used in various contexts. As a non-limiting example, a company may host a chatbot on its website to assist users with technical issues. In a typical instance, a user may initiate a conversation with the chatbot by providing a statement (also referred to herein as an "utterance") to an input mechanism of the chatbot (e.g., an instant messaging-style chat window, as a voice command, via SMS message, in an email, etc.). Based on the user's utterance(s), the chatbot will attempt to identify the user's objective (also referred to herein as an "intent") and select a response designed to retrieve, from the user, the information necessary to meet the user's objective. In a successful conversation, the chatbot may resolve the user's issue without relying on any assistance from a human agent (e.g., a technical support agent). If, however, the chatbot is unable to resolve the user's issue, the user may be transferred to a human agent for further assistance. In most cases, it is preferable if the chatbot can meet the user's objective without transferring the conversation to a human agent.

In existing chatbot systems, chatbots use a "dialogue tree" to guide the conversational flow through a series of responses in an attempt to successfully resolve a given task. For example, for a given user intent, a dialogue tree may specify a response designed to elicit additional items of information needed to resolve the user's intent. Existing chatbot systems suffer from various technical shortcomings, however. For instance, dialogue trees in most existing chatbot systems are hand-coded, requiring a significant amount of time and effort on the part of a human agent to review prior conversation histories and construct the dialogue tree. To generate a portion of a dialogue tree for a single intent in an instant messaging-style channel, for example, the human agent must review the dialogue from prior conversations (e.g., between a human agent and a user) relating to this intent and design an optimal structure for the dialogue tree so as to elicit the desired information from the user in a quick and effective manner. This process must then be repeated to create a dialogue flow for each of the intents (e.g., 100s or 1000s) that the chatbot is designed to handle, for each of the different channels (e.g., instant messaging-style chat window, SMS, email, voice-to-text, etc.) and in each of the different languages supported. In using such dialogue trees, prior chatbot systems utilize various rules to determine how to traverse the dialogue tree and when to transfer to a human agent. These rules may become quite complex and vary for each conversational flow, at each step in a given conversational flow, across communication channels (e.g., different rules for a chat interface versus a voice-based interface), across languages, and across dialects within the same language (e.g., different rules for U.S. English and UK English).

In existing chatbot systems that do utilize machine learning techniques, most use a "supervised" approach in which labeled training samples are created by humans and then used to train a machine learning model. Such techniques also present many technical shortcomings. For example, creating the labeled training samples requires a significant amount of manual effort and, because humans are required to create the labeled sample, these samples quickly become outdated while the human users wait to gather a sufficient amount of new data to label. Additionally, existing chatbot systems that utilize machine learning are often designed so as to perform specific tasks (e.g., setting an alarm using a virtual assistant) and are incapable of facilitating an interactive conversation in which the conversation may last multiple "turns." As such, prior techniques for building a chatbot system are time- and labor-intensive and are of limited utility for uses requiring extended conversations.

In addition to the manual effort required for their generation, prior chatbot systems also suffer from various other technical shortcomings. For example, due to the amount of labor involved, the time-to-deployment associated with building a dialogue tree are high. Additionally, existing chatbot dialogue trees lack personalization as there is only one dialogue structure that is used for all users. Further, a dialogue tree may become outdated quickly, depending on the context in which it is deployed. For example, in instances in which a chatbot is used to provide technical support to remote users of a software product, the dialogue tree may become outdated as updates to the software product are distributed, as new versions of the product are made, as new solutions are developed, etc.

In various embodiments, however, the disclosed techniques provide a technical solution to these technical problems by using reinforcement learning techniques to manage dialogues, for example between a chatbot system and human users. In various embodiments, the disclosed techniques may be said to generally operate in two phases—a "training phase" in which reinforcement learning techniques are used to train a machine learning model based on conversations logs from prior conversations, and a "production phase" in which the trained machine learning model is used to guide and manage conversations between a chatbot and human users.

During the training phase, the disclosed techniques may use conversation logs from prior conversations (e.g., between users and human agents or between users and a chatbot system) in an unsupervised manner to learn to a train a machine learning model that may later be used to guide conversations between a chatbot system and its users. In various embodiments, the conversation log for a given conversation may include multiple "turns" where, in a given turn, the user provides one or more utterances and, in response, the chatbot/human agent provides one or more responses. Multiple "turns" (e.g., two, five, ten, etc.) may be included in a given conversation. In various embodiments, the disclosed techniques may iteratively train the machine learning model by analyzing these utterances, generating a response, and updating the parameters of the model based on "rewards" that are given for that response or for the outcome of the conversation as a whole.

For example, in some embodiments, the system may receive one or more utterances (e.g., from a conversation log) and generate a word-embedding vector based on the utterance(s). As will be appreciated by one of skill in the art with the benefit of this disclosure, the term "word-embedding" refers to the process of representing a word or phrase (e.g., an utterance in a conversation) using a vector of numerical values, providing a numerical representation of the word or phrase. For instance, consider an embodiment in which a chatbot system is used to provide customer support, and an initial utterance in a conversation log provides as follows, "I want to reset my password." In this example, the disclosed techniques may generate a word-embedding vector that provides a numerical representation of the words in this utterance. Based on this word-embedding vector, various embodiments may then determine an "intent" associated with the utterance(s). For example, in various embodiments, the disclosed techniques may compare the word-embedding vector for the current utterance(s) to word-embedding vectors for prior utterances, which may be clustered into groups based on their similarity. In various embodiments, the intent of an utterance is the identified intention or purpose of the utterance based on the word-embedding representation of that utterance. Once the intent associated with the utterance has been determined, the disclosed techniques may then determine a current state of the conversation. For example, in some embodiments, the disclosed techniques determine the state of the conversation based both on the intent of the current utterance and the history of the current conversation (e.g., the intent of prior utterances and the corresponding responses).

In various embodiments, the disclosed techniques use a reinforcement learning ("RL") agent to determine the response to provide to an utterance based on the current state of the conversation. As will be appreciated by one of skill in the art, "reinforcement learning" is a subfield of machine learning in which a software agent interacts with an "environment," observing the "state" of the environment and performing an "action" to transition between states. In the field of reinforcement learning, the term "policy" refers to the algorithm used to select an action to perform in a given state. Stated different, a "policy" provides a mapping from a state to an action. In the context of the present disclosure, the term "state" refers to the state of the conversation as indicated by the current utterance and the previous utterances and responses (if any) that have already taken place in the conversation. Further, in the context of the present disclosure, an "action" is a response (e.g., one or more statements) selected to provide to an utterance based on the state of the state of the conversation. Accordingly, as used herein, a "dialogue policy" is the algorithm used to select a response based on a given state of the conversation.

As described in more detail below, various disclosed embodiments utilize a reinforcement learning technique known as deep Q-learning in which an artificial neural network ("ANN") (e.g., a deep ANN ("DNN")) is used to estimate optimal state-action values (called "Q-values," where the "Q" stands for "quality") for the available actions. As will be appreciated by one of skill in the art with the benefit of this disclosure, the Q-value for a given state-action pair (s, a) is the sum of the discounted future rewards the agent can expect (on average) after it reaches the state s and selects action a, assuming it selects optimal actions after action a. The DNN used to estimate the Q-values is referred to as a Deep Q-learning Network ("DQN"). These Q-values may then be used to select the optimal available action in a given state.

In various embodiments, the DQN is trained during a training phase based on conversation logs from prior conversations (e.g., between human users). For example, the DQN may be provided with information indicative of a current state (that is, an "observation" of the current state) as input and determine Q-values corresponding to the available actions (e.g., responses) that may be performed. In various embodiments, the RL agent is provided with a "reward" based on its selected action and then updates the parameters of the DQN accordingly with the goal of training the DQN to maximize an expected total reward based on the selected response it provides during a conversation.

Once trained, the DQN may be utilized by a chatbot system to guide a "live" conversation with a human user by selecting appropriate responses to the human user's utterances based on the evolving state of the conversation (e.g., based both on the current utterance and the prior events in the conversation). For example, given an input value corresponding to the current state of the conversation, the DQN can generate approximate Q-values for each available action (e.g., the available responses). Based on these approximate Q-values, the RL agent may apply the dialogue policy of selecting the response corresponding to the output node with the highest approximate Q-value. The content of these live conversations, in turn, may be stored and used for subsequent additional training of the dialogue policy, further refining the efficacy of the dialogue policy.

Referring now to FIG. 1, block diagram 100 depicts a chatbot system 102 with a response determination module 104, which, in turn, includes a RL agent 106. In various embodiments, the response determination module 104 is operable to use reinforcement learning techniques to guide a conversation between the chatbot system 102 and an end user. For example, in the depicted embodiment, a user 110 of client device 108 has initiated a conversation with the chatbot system 102 (e.g., via an instant messenger-style chat interface). In this conversation, the user 110 may provide one or more utterances 112 (e.g., statements typed into the chat interface) and, based on these utterances 112, the response determination module 104 may use the trained machine learning model to determine a response 114.

For example, the user 110 may present an issue in the utterances 112. As one non-limiting example, the user 110 may be seeking technical assistance regarding a product or service for which the chatbot system 102 is implemented to provide customer support. Based on the content of the utterances 112, the response determination module 104 may determine an appropriate response 114 to obtain the information necessary to resolve the user 110's issue. The conversation between the user 110 and the chatbot system 102 may continue for multiple "turns" in which the user 110 provides one or more utterances 112 and the response determination module 104 generates one or more responses 114. If the chatbot system 102 is able to successfully resolve the user 110's issue (e.g., by providing the appropriate technical information), the conversation may be terminated and the conversation log 120 for the conversation (e.g., a transcript of the utterances 112 and corresponding responses 114 made during the conversation) may be stored in a conversation log data store 116. If, however, the chatbot system 102 is unable to resolve the user 110's issue (e.g., within a specified number of turns), the chatbot system 102 may transfer the conversation to a human agent 124, who may then take over the conversation with the user 110. In such instances, the conversation log 120 (optionally including the content of the conversation between the user 110 and the human agent 124) may be stored in the conversation log data store 116 as well.

In various embodiments, the disclosed techniques may use conversation logs from prior conversations (e.g., conversations between users and a chatbot (including or other than chatbot system 102) or between users and human agents) as training data to train and refine one or more machine learning models. For example, during a training phase, the response determination module 104 may use the conversation logs from prior conversations to iteratively train a machine learning model. As explained in greater detail below with reference to FIG. 2, the response determination module 104 may analyze one or more utterances in the log for a conversation and, based on the utterance(s), generate a response. That response may then be evaluated and compared to an actual response that was provided during the prior conversation (e.g., by a human agent), and a corresponding reward may be provided to the response determination module 104. The response determination module 104 may use this reward to further refine the machine learning model. Once the machine learning model has been trained it may be deployed for use managing conversations with human users.

Note that, in various embodiments, the disclosed techniques may continuously (e.g., at set intervals) train the machine learning model based on prior conversations, improving the efficiency and efficacy of the chatbot system 102 through this reinforcement learning framework. Further, in various embodiments, since the chatbot system 102 does not rely on hand-coded dialogue trees, the response determination module 104 has the ability to adjust the way in which it selects responses 114 over time, enabling the machine learning model to adapt to changes, such as changes in the manner in which users interact with the chatbot system 102, changes to a product or service for which the chatbot system 102 is implemented to support, etc. As a non-limiting example, if the chatbot system 102 needs to be updated to accommodate a new conversational flow (e.g., to provide technical information regarding a new product or service), various embodiments do not require a human to hand-code a decision tree or label training samples for that flow. Instead, as the chatbot system 102 engages in conversations for this flow, the system may initially transfer a number of conversations to be resolved by a human agent. The disclosed techniques may then observe those conversations between the human user and the human agent regarding this new flow and the RL agent 106 may adapt the machine learning model accordingly. Additionally, note that, in various embodiments, the disclosed techniques may be "channel agnostic" in that they may be used to guide conversations with users regardless of the particular channel (e.g., chat interface, email, audio, etc.) over which the conversation is being performed.

Further note that, in various embodiments, the disclosed techniques may be used to train a machine learning model for a chatbot system 102 regardless of whether that chatbot system 102 previously utilized a machine learning model. For example, in some embodiments, the disclosed techniques may be used to train a machine learning model from scratch, which may then be used by the chatbot system 102 to guide conversations with human users. In other embodiments, however, the disclosed techniques may also be applied in instances in which a chatbot system 102 has an existing dialogue tree. For example, in instances in which chatbot system 102 uses a previously generated dialogue tree, the disclosed techniques may be used to train a machine learning model based on conversation logs, with little to no human intervention, to generate the steps in a given flow, the intents to be identified, the threshold values to apply, and the structure of the tree. Thus, in various embodiments, the disclosed techniques may be used to generate a new dialogue policy or to improve existing dialogue trees.

Additionally, note that, although described primarily in the context of a chatbot system 102 that interacts with human users without the aid of a human agent, the disclosed techniques may be used in various suitable contexts. For example, in some embodiments, the disclosed response determination module 104 may be used to assist human agents that are engaged in live conversations with human users, generating suggested responses 114 based on the user 110's utterances 112, which the human agent may either use, augment, or ignore. Additionally, in some embodiments, the disclosed techniques may be used to facilitate resolution and protection operations to suggest responses when attempting to mediate disputes between multiple parties. Further, in some embodiments, the disclosed techniques may be used in the context of personal recommendations, optimizing the content and frequency of communications (e.g., digital marketing communications) sent to users.

Figure 2:
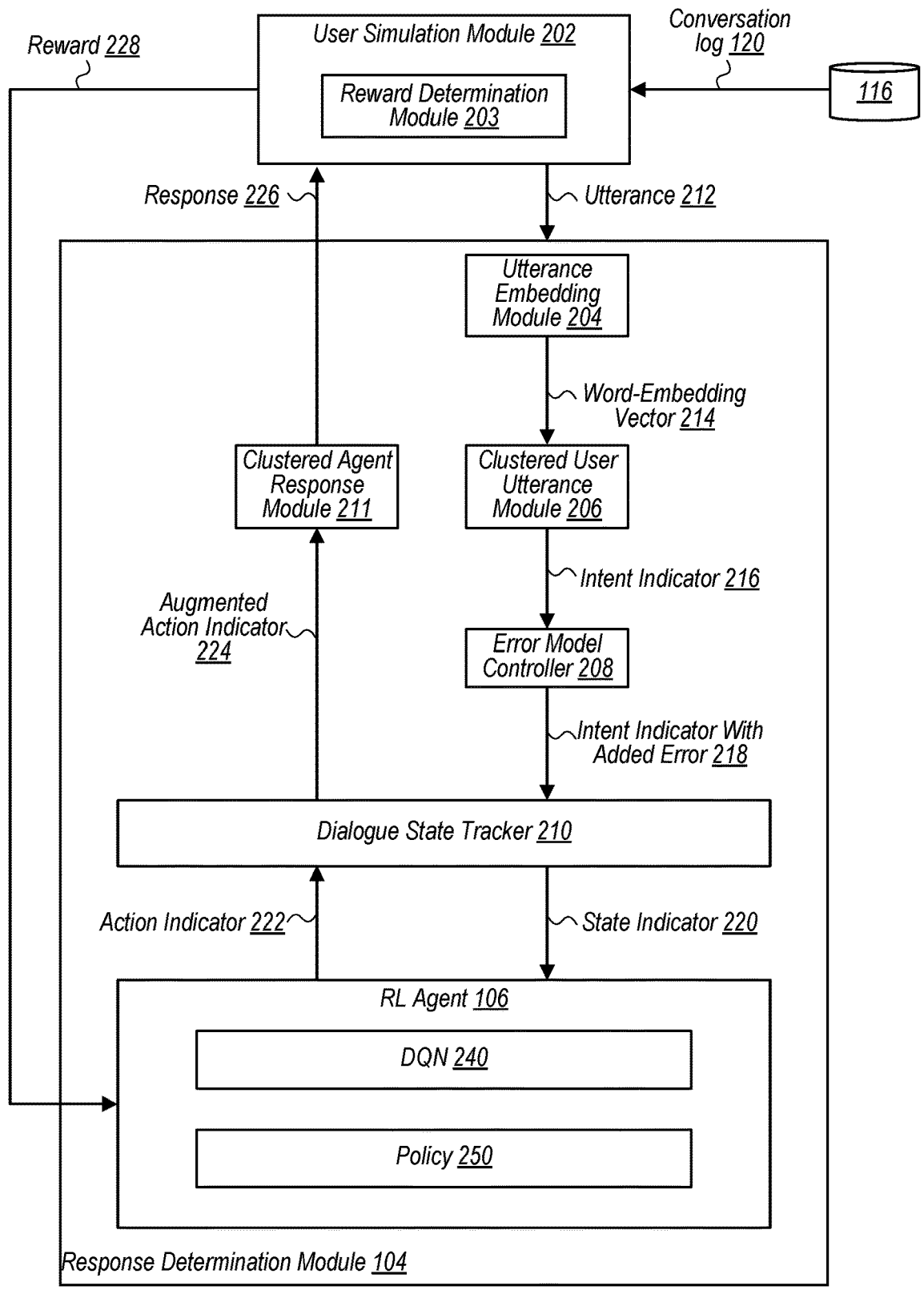
FIG. 2 is a block diagram illustrating an example response determination module during a training phase, according to some embodiments.

Turning now to FIG. 2, block diagram 200 provides a more detailed depiction of response determination module 104 during a training phase, according to some embodiments. In the depicted embodiment, the response determination module 104 includes utterance embedding module 204, clustered user utterance module 206, error model controller 208, dialogue state tracker 210, RL agent 106, and clustered agent response module 211. Note, however, that this embodiment is provided merely as one non-limiting example and, in other embodiments, response determination module 104 may include additional, fewer, or different components than those depicted in FIG. 2.

Further, in the depicted embodiment, block diagram 200 includes a user simulation module 202, which, in various embodiments, is operable to facilitate training of the DQN 240 by RL agent 106. For example, in some embodiments, the user simulation module 202 may retrieve a conversation log 120 from the conversation log data store 116, where the conversation log 120 specifies one or more utterances and responses made by a user and an agent during a prior conversation. In various embodiments, the user simulation module 202 may break the prior conversation up into "turns" and provide one or more utterances 212, from a first turn of the conversation, to the response determination module 104. As explained in more detail below, once the response determination module 104 provides a response 226 to the first utterance 212, the user simulation module 202 may generate a reward 228 and provide the response determination module 104 with the next utterance in the conversation log 120, continuing in this manner until the end of the conversation has been reached. This process may then be repeated for one or more (and, potentially, many) conversation logs 120 stored in conversation log data store 116. Thus, in some embodiments, the user simulation module 202 may be thought of as playing the role of a human user, breaking the conversation up by utterance, checking whether the maximum number of turns in the conversation has been reached, generating rewards, etc.

In various embodiments, the response determination module 104 uses an RL agent 106 to select an action based on a current state of the conversation, as explained in more detail below. Note that, in various embodiments, the RL agent 106 may utilize as input a discrete representation of the conversation to select the appropriate action. The content of the utterances 212, however, is not provided in a discrete format. Instead, the language used by a human user during a conversation is subjective and nuanced, using diction and word sequence to convey intent. As such, in various embodiments, the utterances provided by a human user may not be directly usable by the RL agent 106 to select an appropriate action. To address this technical problem, the disclosed techniques, in various embodiments, utilize the utterance embedding module 204, clustered user utterance module 206, and dialogue state tracker 210 to create a discrete representation of the utterances, the intent of the utterances, and the state of the conversation, which may then be used by the RL agent 106 to select an appropriate response 226.

In various embodiments, the utterance embedding module 204 is operable to generate a word-embedding vector 214 based on the utterance 212. As noted above, in various embodiments, the word-embedding vector 214 is a numerical representation of the content (e.g., words, phrases, numbers, punctuation, etc.) in the one or more utterances 212. Word-embedding vector 214 may be represented using any of various suitable format and using any of various suitable data types. In one non-limiting embodiment, the word-embedding vector 214 may be represented using an array data structure having 500 elements, though any suitable size and data structures may be used. Utterance embedding module 204, according to some non-limiting embodiments, is described in more detail below with reference to FIG. 3. For the purposes of the present discussion, however, note that, in some embodiments, utterance embedding module 204 may utilize a deep averaging network ("DAN") to generate the word-embedding vector 214 based on the user utterance 212.

Response determination module 104 further includes clustered user utterance module 206, which, in various embodiments, is operable to identify an intent of the utterance(s) 212 based on the word-embedding vector 214 and generate a corresponding intent indicator 216. For example, in some embodiments, the clustered user utterance module 206 may compare the word-embedding vector 214 for the utterance 212 to word-embedding vectors from other, prior utterances (e.g., from prior conversations) and may identify a cluster of utterances into which the utterance 212 belongs. For example, in some embodiments, the clustered user utterance module 206 is operable to, prior to the training operation depicted in FIG. 2, use k-means clustering (or any other suitable clustering algorithm) to partition user utterances from various conversation logs 120 into a number of clusters, where each user utterance belongs to the cluster with the nearest centroid. In various embodiments, the disclosed techniques utilize the cluster identifiers for the various user utterances 212 and responses 226 in a conversation to determine and track the state of that conversation. For example, as described in detail below, the RL agent 106 uses an input value that is based on the state of the conversation as indicated by cluster identifiers for the user utterances 212 and response 226 that have previously occurred (if any) during the conversation. Clustered user utterance module 206, according to some non-limiting embodiments, is described in more detail below with reference to FIG. 4.

In various embodiments, the intent indicator 216 identifies the cluster associated with the intent of the utterance 212. In some embodiments, for example, the intent indicator 216 may be provided as a fixed-length vector (e.g., encoded using one-hot encoding) used to identify the cluster to which the utterance 212 belongs. Consider, as a non-limiting example, an instance in which there are 300 different clusters of user utterances numbered 1-300 and, based on the word-embedding vector 214, the clustered user utterance module 206 determines that the user utterance 212 belongs in cluster 50. In such an embodiment, the intent indicator 216 may identify cluster 50 as the intent associated with the utterance 212. For example, in an embodiment in which one-hot encoding is used, the intent indicator 216 may be a vector of size 300 with the value of 0 at all elements of the vector except at the index corresponding to cluster 50 (e.g., the $50^{th}$ element in the vector), which may have a value of 1. Note, however, that this embodiment is provided merely as one non-limiting example and, in other embodiments, any other suitable encoding technique may be used.

In FIG. 2, the response determination module 104 further includes an error model controller 208, which, in various embodiments, is operable to add noise to the intent indicator 216 to generate the intent indicator with added error 218. As described in detail below with reference to FIG. 5, in various embodiments adding noise to the signal (e.g., the vector representation of intent indicator 216) during the training phase may present various technical benefits, such as helping the RL agent 106 to train the DQN 240 such that it is robust and capable of handling "noise" when it is encountered during live conversations. In the embodiment depicted in FIG. 2, for example, error model controller 208 may add noise by altering the intent indicator 216 to instead refer to an intent other than the one determined by the clustered user utterance module 206. The intent indicator with added error 218, in various embodiments, may be provided as a fixed-length vector (e.g., encoded using one-hot encoding) where the length of the vector is the same as the number of clusters of user utterances.

Response determination module 104 further includes dialogue state tracker 210, which, in various embodiments, is operable to determine a state of the conversation based on the intent of the current utterance 212 and any previous activity in the conversation. For example, in various embodiments, the dialogue state tracker 210 may store information regarding the previous intents (as identified by the clustered user utterance module 206 based on the utterances 212) and responses 226 (provided by the clustered agent response module 211) that have arisen during the course of a conversation. Based on the history of the conversation and the intent indicator with added error 218 for the current utterance(s) 212, the dialogue state tracker 210 may generate state indicator 220. Non-limiting embodiments of dialogue state tracker 210 are described in detail below with reference to FIG. 6.

In the depicted embodiment, the state indicator 220 is provided as an input value to the RL agent 106. In various embodiments, the RL agent 106 is operable to determine an appropriate response to provide based on the current state of the conversation (as indicated by state indicator 220). Non-limiting embodiments of RL agent 106, including DQN 240 and policy 250, are described in detail below with reference to FIG. 7. For the purposes of the present discussion, however, note that, in various embodiments, the DQN 240 is used to generate approximate Q-values for the various available responses based on the state indicator 220. For example, in some embodiments the DQN 240 includes an input layer to receive the state indicator 220 (e.g., a feature vector) as an input value. Further, in various embodiments, the DQN 240 includes one or more hidden layers and an output layer, where the output layer includes a set of nodes corresponding to the set of available responses. In one non-limiting embodiment, for example, there is an output node corresponding to each of the clusters of agent responses. Based on the state indicator 220, the DQN 240 may generate output values at the output nodes, where these output values are the approximated Q-value for the available actions in the current state. Using these approximate Q-values, the RL agent 106 may utilize a policy 250 to select a response to provide to the utterance 212. The RL agent 106 may then output an action indicator 222 (formatted as a one-hot encoded vector, as a non-limiting example) indicative of this selected action. Note that, in various embodiments, the RL agent 106 may utilize different policies 250 during the training phase and the production phase, as described in more detail below with reference to FIG. 7.

In various embodiments, the action indicator 222 indicates a particular cluster of the clustered agent responses. Note that, in various embodiments, the clustered agent response module 211 is operable to, prior to the disclosed training operation, use k-means clustering (or any other suitable clustering algorithm) to partition agent responses from various conversation logs 120 into a number of clusters of similar responses, where each of the prior agent responses belongs to the cluster with the nearest centroid. For example, in some embodiments, each of the clusters of agent responses includes multiple different agent responses that have been grouped into that cluster. Further, in various embodiments, each cluster has a representative response, for example the agent response at (or closest to) the centroid of that cluster. Accordingly, in various embodiments, once the cluster identifier for one of the clusters of agent responses has been selected (e.g., as indicated by action indicator 222), the clustered agent response module 211 may select, as response 226, one of the responses from that cluster. In some embodiments, for example, the clustered agent response module 211 may select the representative response for the identified cluster as the response 226.

In the depicted embodiment, augmented action indicator 224 is provided to clustered agent response module 211. In some embodiments, however, rather than augmented action indicator 224, the action indicator 222 may be provided to the clustered agent response module 211. In such embodiments, the clustered agent response module 211 may select the response 226 based on the action indicator 222. For example, in some embodiments, the action indicator 222 may indicate a particular cluster (e.g., cluster 29) out of multiple clusters of possible responses (e.g., 150 clusters of agent responses). In such embodiments, the clustered agent response module 211 may identify the cluster indicated by the action indicator 222 and select a response from that cluster to provide as the response 226. For example, the clustered agent response module 211 may select the representative response from that cluster, may select one of the responses from that cluster randomly, or using any other suitable selection technique.

In other embodiments, however, the particular response 226 may be modified in so as to be more user-friendly (e.g., to avoid repeating a particular response 226 multiple times) or to provide a more realistic dialogue with the user. For example, in the depicted embodiment, the action indicator 222 is provided to the dialogue state tracker 210, which generates augmented action indicator 224. In various embodiments, the augmented action indicator 224 may indicate the same cluster of agent responses as the action indicator 222, but may further specify one or more ways in which to modify the response 226. For example, in some embodiments the augmented action indicator 224 may include one or more items of information that the clustered agent response module 211 may use to modify the response 226. Clustered agent response module 211, in various embodiments, may then use this augmented action to select the appropriate agent response 226 to provide to the user simulation module 202. Note that, in some embodiments, the response determination module 104 may use natural language generation to generate the text in a given response, which may be particularly advantageous in instances in which the response determination module 104 selects responses from the same cluster multiple times during the course of a single conversation.

In the depicted embodiment, the response determination module 104 then provides the response 226 to the user simulation module 202, which, in the depicted embodiment, includes a reward determination module 203. In various embodiments, the reward determination module 203 is operable to determine an appropriate reward 228 to provide to the response determination module 104 based on the response 226. For example, the reward determination module 203 may use a rules-based approach to generate a reward 228 based on the response 226. The reward determination module 203 may determine what reward 228, if any, to provide to the response determination module 104 based on various factors.

As one non-limiting example, in various embodiments, the reward determination module 203 may compare the response 226 generated by the response determination module 104 to the actual response provided during the original conversation on which the conversation log 120 is based. In such embodiments, the reward determination module 203 may then generate a reward 228 that is based on the similarity of the responses, e.g., with higher rewards 228 being given for responses 226 that are more similar to the actual response.

As another non-limiting example, in some embodiments reward determination module 203 may compare the cluster of agent responses from which the response 226 was selected to the cluster of agent responses to which the actual response (provided during the original conversation) belongs. For example, as described in more detail below with reference to FIG. 4, in some embodiments the clustered agent response module 211 includes a clustering model that is trained, prior to use in the operation described with reference to FIG. 2, based on the agent responses from conversation logs 120 for prior conversations. Accordingly, in some embodiments, the clustered agent response module 211 is operable to determine (e.g., either prior to or at the time that reward 228 is determined) the cluster with which the actual response is associated, and compare that cluster to the cluster with which the response 226 is associated. For example, if the response 226 is from the same cluster as the actual response from the original conversation, the reward determination module 203 may generate a reward 228 that is positive (e.g., +1, +2, +3, etc.) or simply non-negative (e.g., 0). If the response 226 successfully concludes the conversation (e.g., resolves the issue presented by the user), the reward 228 may be significantly larger (e.g., +50, +100, etc.). If, however, the response 226 is dissimilar from (e.g., from a different cluster than) the actual response or deemed to inadequately advance the conversation towards successful resolution, the reward 228 may be negative (e.g., −1, −2, −3, etc.), and if the response 226 concludes the conversation in an unsuccessful manner (e.g., a response that would prompt the user to request a human agent, the conversation requires more steps than necessary to resolve the issue(s) presented by the conversation, etc.), the reward 228 may be significantly more negative (e.g., −100). Note, however, that this example is provided merely as one non-limiting example and, in other embodiments, any suitable reward system may be utilized to provide feedback to the RL agent 106.

Further, in some embodiment the reward 228 may be based on the number of turns it takes for the response determination module 104 to successfully complete the conversation, incentivizing shorter conversations over longer conversations. Accordingly, in some embodiments, the reward determination module 203 may determine the reward 228 so as to incentivize the RL agent 106 to select responses 226 that minimize the number of turns required to successfully complete the conversation.

In FIG. 2, the reward 228 is provided to the RL agent 106, which may use the reward 228 to update one or more parameters of the DQN 240. For example, in some embodiments the reward 228 may be used to modify (e.g., using stochastic gradient descent or other suitable techniques) the trainable parameters of the DQN 240 in an effort to maximize the expected value of the total reward provided to the RL agent 106 based on the responses 226 that it selects. In various embodiments, after receiving the response 226, the user simulation module 202 may select the next utterance 212 from the conversation log 120 and provide that utterance 212 to the response determination module 104, which may generate a response 226 as described above. This process may be repeated until the user simulation module 202 has reached the end of the conversation specified in the conversation log 120. Note that, in some embodiments, the user simulation module 202 may not provide a reward 228 after every turn in a conversation. Instead, in some embodiments, the reward determination module 203 may generate rewards 228 at the end of the conversation, or after some, but not all, of the responses 226 provided by response determination module 104. In various embodiments, this training process may be repeated for any suitable number of conversations (e.g., 1,000, 10,000, 50,000, etc.).

In some instances, the process described above may be repeated one or more times such that the response determination module 104 may generate multiple different responses 226 to the same utterance 212 in an attempt to find a response that maximizes the resulting reward. For example, in some embodiments, if the reward 228 for a given response 226 is below some threshold value (e.g., 0, −1, −3, −5, etc.), the RL agent 106 may use the reward 228 to update the DQN 240 and the user simulation module 202 may provide the same utterance 212 to the response determination module 104, which may then select a new response 226 based on the updated DQN 240. This process may be repeated any suitable number of times. For example, in some embodiments, the response determination module 104 may generate responses 226 for the same utterance 212 in a conversation until the provided response 226 results in a reward 228 that exceeds some particular threshold value (e.g., 0, +1, +3, etc.). Similarly, in some embodiments, the disclosed techniques may include using the conversation log 120 for a given conversation multiple times during the training phase so as to further refine the DQN 240 such that it is capable of selecting responses 226 that maximize the total possible reward for the conversation.

Further note that, in some embodiments, in addition to using the user simulation module 202, the training phase may include a human user manually training the RL agent 106 based on one or more conversations. As one non-limiting example, in some embodiments, the disclosed techniques may include using the user simulation module 202 to train the RL agent 106 based on a (potentially large) number of conversation logs 120 from conversation log data store 116. Then, in some embodiments, a human user may perform one or more final rounds of training by manually providing utterances and determining rewards. In various embodiments, such an approach may allow a subject-matter expert to refine the DQN 240 as-needed to improve its performance in a desired area. For example, the human user may select conversations for which the response determination module 104 is not performing well (e.g., is unable to successfully conclude the conversation) and manually step through the turns in the conversation, assigning rewards appropriately so as to fine tune the DQN 240. Further note that the system used to during the training phase to train the DQN 240 may be the same as or separate from the system (e.g., chatbot system 102) that uses the trained DQN 240 to guide conversations with users.

Figure 3:
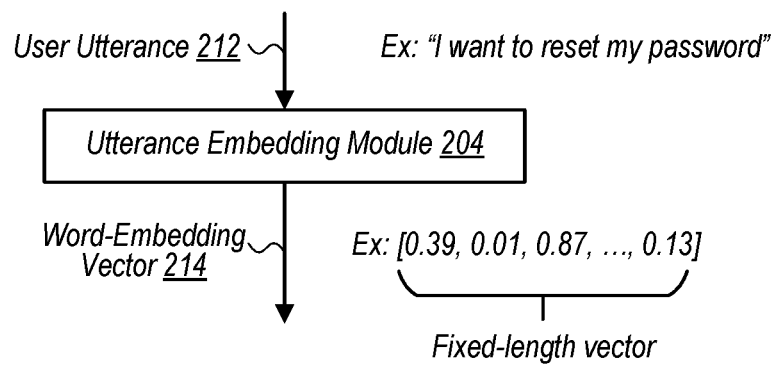
FIG. 3 is a block diagram illustrating an example utterance embedding module, according to some embodiments.

Turning now to FIG. 3, block diagram 300 depicts an example embodiment of utterance embedding module 204. As noted above, in various embodiments, utterance embedding module 204 is operable to generate a word-embedding vector 214 based on an utterance 212. For example, in the depicted embodiment, the utterance 212 is "I want to reset my password," and the utterance embedding module 204 generates a corresponding word-embedding vector 214 that provides a numerical representation of this utterance 212. (Note that although only a single utterance 212 is depicted in diagram 300, this embodiment is provided merely as a non-limiting example. In other embodiments, the utterance embedding module 204 is operable to generate a word-embedding vector 214 based on multiple utterances 212.)

In some embodiments, the word-embedding vector 214 is a fixed length vector (e.g., of size 100, 200, 500, 1000, etc.) of numerical values within a certain range (e.g., 0 to 1, −1 to +1, 1 to 10, etc.) and provides a numerical representation of the "tokens" (that is, the words, numbers, punctuation marks, etc.) within the utterance 212. In various embodiments, the word-embedding vector 214 may be used to determine how similar one utterance is to another, allowing the clustered user utterance module 206 to identify an intent associated with an utterance 212. Utterance embedding module 204 may use any of various suitable techniques to generate the word-embedding vector 214 based on one or more utterances 212. For example, in one non-limiting embodiment the utterance embedding module 204 may use the TensorFlow™ Universal Sentence Encoder to generate the word-embedding vectors 214 for an utterance 212.

Figure 4:
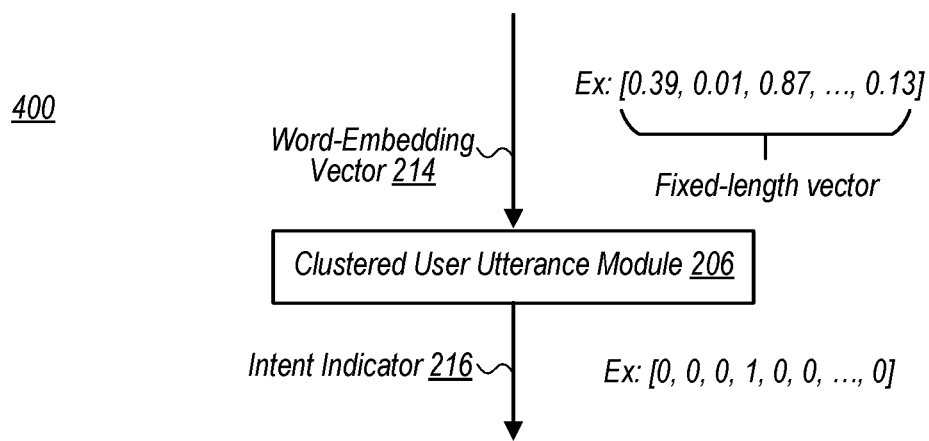
FIG. 4 is a block diagram illustrating an example clustered user utterance module, according to some embodiments.

In FIG. 4, block diagram 400 depicts an example clustered user utterance module 206, according to some embodiments. In various embodiments, the clustered user utterance module 206 is operable to generate an intent indicator 216 for a given utterance 212 based on the word-embedding vector 214 representing that utterance 212. As will be appreciated by one of skill in the art with the benefit of this disclosure, the term "clustering" in the context of machine learning refers to the task of identifying similar instances and grouping them into "clusters." Training a clustering model may be performed in an unsupervised manner in which a training dataset of unlabeled data samples are provided as input and a clustering algorithm (e.g., the k-means algorithm) evaluates the features of the data samples, assigning each data sample to one of multiple clusters. Once trained, a clustering model may then evaluate a previously unseen data sample and assign it to an appropriate cluster.

In various embodiments, the clustered user utterance module 206 may include a clustering model that is trained prior to being used to generate word-embedding vectors 214 based on user utterances 212 during either the training phase or production phase of the disclosed techniques described above. For example, in some such embodiments, the clustered user utterance module 206 may use a clustering algorithm (e.g., the k-means algorithm, as one non-limiting example) to analyze word-embedding representations of user utterances 212 from a corpus of conversation logs 120, assigning the various utterances 212 to appropriate clusters of utterances. Note that, in some embodiments, the clustering algorithm used by clustered user utterance module 206 may utilize a large number (e.g., thousands, tens of thousands, etc.) of conversation logs 120 during the training process to generate meaningful cluster representations. Once clustered user utterance module 206 has been trained, it may then be used, as described above with reference to FIG. 2, to determine the cluster of user utterances to which an utterance 212 belongs and generate an intent indicator 216 indicative of that cluster.

Further note that, in various embodiments, a similar technique may be utilized for clustered agent response module 211. For example, in some embodiments, the clustered agent response module 211 may include a clustering model that is trained prior to being used, as described above, to select a response 226 based on an output value (e.g., action indicator 222 or augmented action indicator 224) from the RL agent 106. In some such embodiments, for instance, the clustered agent response module 211 may use a clustering algorithm to analyze word-embedding representations of agent responses from one or more conversation logs 120, assigning the various agent responses to appropriate clusters of agent responses. Once trained, the clustered agent response module 211 may be used, as described above with reference to FIG. 2, during a training phase or production phase of the disclosed techniques. Note that, in embodiments in which the conversation logs 120 correspond to prior conversations between a user and a customer-support representative, it may be common to have a larger number of user utterance clusters (e.g., 500) than agent response clusters (e.g., 200). In such instances, this disparity in the number of clusters reflects the tendency of customer-service representatives to provide relatively standard responses to multiple different types of queries, while different users may make the same query or request using various different utterances.

Figure 5:
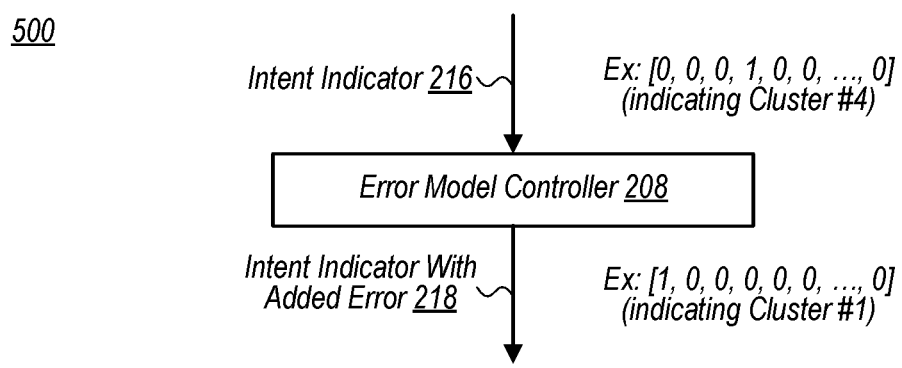
FIG. 5 is a block diagram illustrating an example error model controller, according to some embodiments.

Referring to FIG. 5, block diagram 500 depicts an example error model controller 208, according to some embodiments. In various embodiments, the error model controller 208 is operable to generate an intent indicator with added error 218 based on the intent indicator 216 for a given user utterance 212.

In various embodiments adding noise to the signal (e.g., the vector representation of intent indicator 216) during the training phase may present various technical benefits. For instance, in conversations with actual users, the response determination module 104 will be exposed to various forms of noise. As one non-limiting example, users may behave unpredictably during a conversation by providing non-responsive utterances. As another example, there may be noise generated by the channel through which the user and the chatbot system 102 are communicating. For instance, in situations in which the user provides utterances verbally, which are then transcribed prior to being provided to chatbot system 102, the speech-to-text conversion process may introduce errors in the form of incorrect transcriptions. Thus, in various embodiments, by introducing noise to the system during the learning process, the error model controller 208 may help the RL agent 106 train the DQN 240 such that it is robust and capable of handling noise when it is encountered during live conversations.

In the embodiment of FIG. 5, the error model controller 208 receives an intent indicator 216 that indicates the intent associated with cluster number 4 (of the various clusters of user utterances). Based on intent indicator 216, the error model controller 208 of FIG. 5 generates intent indicator with added error 218 such that it identifies a different cluster—cluster 1. The intent indicator with added error 218, in various embodiments, may be provided as a fixed-length vector (e.g., encoded using one-hot encoding) where the length of the vector is the same as the number of clusters of user utterances.

In some embodiments the error model controller 208 may select this other cluster in a random or pseudo-random manner such that the intent indicator with added error 218 indicates a random one of the user utterance clusters. In other embodiments, however, the error model controller 208 may select this other cluster based on inter-cluster similarity. That is, in some embodiments the error model controller 208 may select the cluster that is similar (e.g., most similar, second most similar, etc.) to the cluster identified in intent indicator 216 (e.g., as measured by distance between the centroids of the corresponding clusters). This approach may provide various technical benefits. For example, rather than selecting a random intent, the error model controller 208 may instead select an intent that is similar to, though different from, the intent identified by the clustered user utterance module 206, which may help train the DQN 240 to perform well in instances in which there is a minor misunderstanding in the intent of a user's utterance. Note that, in various embodiments, the error model controller 208 may be implemented at other points within the response determination module 104 (e.g., before utterance embedding module 204, between the utterance embedding module 204 and clustered user utterance module 206, between the dialogue state tracker 210 and RL agent 106, etc.). Further, note that, in some embodiments, the response determination module 104 may include multiple error model controllers 208, as desired. Additionally, in some embodiments, the error model controller 208 may be omitted.

Figure 6:
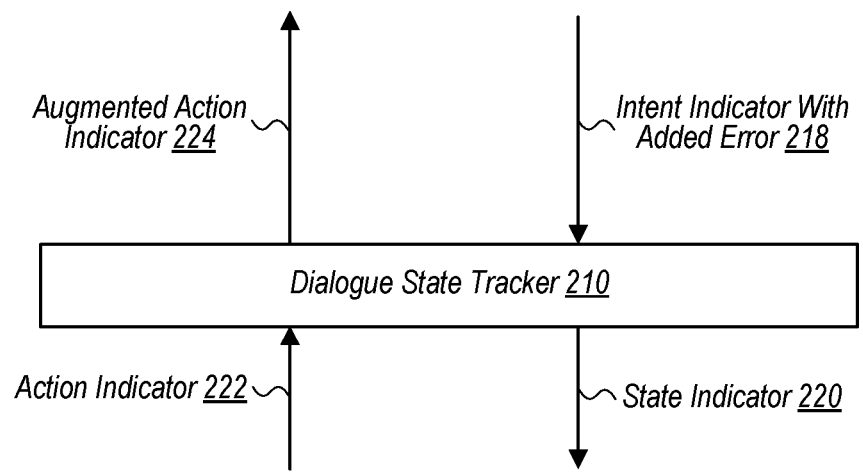
FIG. 6 is a block diagram illustrating an example dialogue state tracker, according to some embodiments.

In FIG. 6, block diagram 600 depicts an example dialogue state tracker 210, according to some embodiments. In various embodiments, the dialogue state tracker 210 is operable to determine a state of the conversation based on the intent of the current utterance 212 and any previous activity in the conversation. Further, in various embodiments, the dialogue state tracker 210 is operable to generate a state indicator 220, indicative of the state of the conversation, for use as an input to the RL agent 106.

For example, in various embodiments, the dialogue state tracker 210 stores information indicating the previous intents (as identified by the clustered user utterance module 206 based on the utterances 212) and responses (provided by the clustered agent response module 211) that have taken place during a conversation. Based on the history of the conversation and the intent indicator with added error 218 (or intent indicator 216) for the current utterance(s) 212, the dialogue state tracker 210 may generate state indicator 220. In some embodiments, for example, the state indicator 220 may be provided as a vector quantity indicating the current state of the conversation for use as an input to the RL agent 106. For example, in some embodiments the dialogue state tracker 210 generates the state indicator 220 as an input feature vector for the DQN 240 based on the intent of the current utterance 212, the intent(s) from prior utterances 212 in the conversation (if any), the intent(s) from prior agent response 226 (if any), the number of turns that have taken place in the conversation so far, etc.

Consider, as a non-limiting example, an instance in which the response determination module 104 has already received utterance 212A, determined that the intent of the utterance 212A is associated with user utterance cluster 50, and used the dialogue policy 250 to select an agent response 226A that is associated with agent response cluster 15. Then, in this non-limiting example, the response determination module 104 receives a second user utterance 212B, which is determined to have an intent that corresponds to user utterance cluster 37. In this example, the dialogue state tracker 210 may generate the state indicator 220 as an array data structure (e.g., a vector) that includes data elements that indicate: the intent of the current user utterance 212B (e.g., an identifier for user utterance cluster 37), the intent(s) of the prior user utterance(s) 212A (e.g., an identifier for user utterance cluster 50), the intent(s) for the prior agent responses 226A (e.g., an identifier for agent response cluster 15), a number of turns that have already taken place in the conversation (e.g., 1), and a number of allowed turns left before the conversation is terminated (e.g., 19). Note, however, that this embodiment is provided merely as one non-limiting example and, in other embodiments, the state indicator 220 may include additional, fewer, or different data values.

Figure 7:
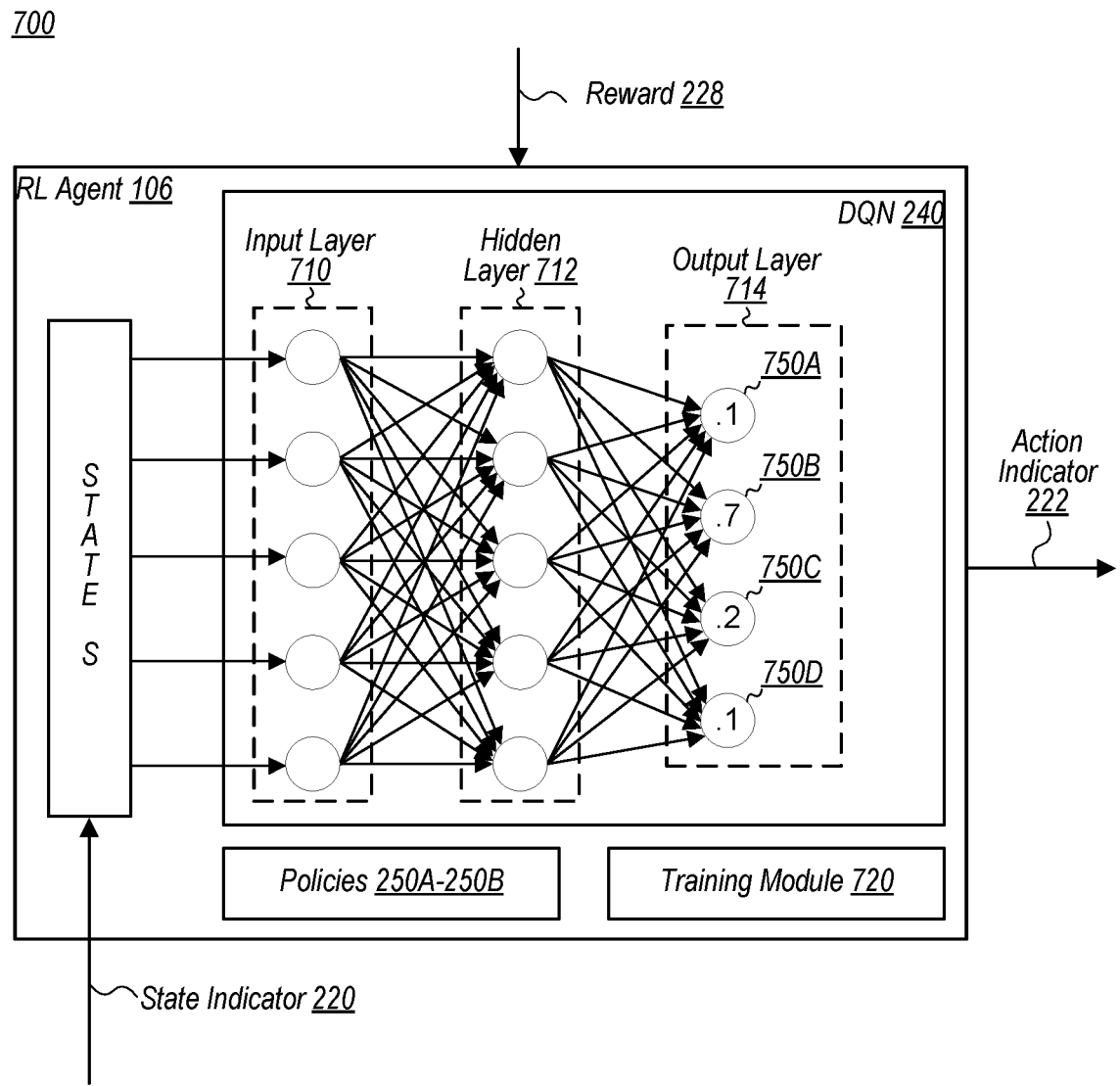
FIG. 7 is a block diagram illustrating an example reinforcement learning agent, according to some embodiments.

Turning now to FIG. 7, block diagram 700 depicts an example RL agent 106, according to some embodiments. In various embodiments, the RL agent 106 is operable to receive, as input, the state indicator 220 indicative of the current state of the conversation and, based on the state indicator 220, output an action indicator 222 indicative of the response 226 to provide to one or more utterances 212. Based on this action indicator 222, the RL agent 106 may receive a reward 228, which the RL agent 106 may use to train the DQN 240.

In FIG. 7, DQN 240 is implemented using a fully connected DNN with an input layer 710, one hidden layer 712, and an output layer 714. Note, however, that this architecture is provided merely as one non-limiting embodiment. In other embodiments, any suitable deep or shallow ANN architecture may be used for the ANN in the DQN 240, including a convolutional neural network ("CNN"), a recurrent neural network ("RNN") (e.g., a long short-term memory ("LSTM") network), or any other suitable ANN architecture or combination thereof. Further note that, although a single hidden layer 712 is shown in FIG. 7, this is merely one non-limiting example. In other embodiments the DQN 240 may include any suitable number of hidden layers 712.

The state indicator 220, in various embodiments, is a feature vector indicative of the current state of the conversation and is provided as input to the input layer 710 of the DQN 240. In various embodiments, this input signal propagates from the input layer 710, through one or more hidden layers 712, to an output layer 714. In FIG. 7, output layer 714 includes a set of output nodes 750. Note that although only four output nodes 750A-750D are shown in FIG. 7 for clarity, the output layer 714 may include any suitable number of output nodes 750. In some embodiments, for example, the number of output nodes 750 in the output layer 714 may be the same as the number of clusters of agent responses. For example, in some such embodiments, each of the output nodes 750 corresponds to a particular cluster of agent responses. That is, in various embodiments, the output nodes 750 in the output layer 714 correspond to available responses that may be provided, by the response determination module 104, to the current utterance 212 based on the state of the conversation. In various embodiments, the DQN 240 may generate output values at the output nodes 750, where these output values are the approximated Q-values for the responses from these different clusters based on the current state of the conversation. Stated differently, in various embodiments, each output node 750 will be assigned an output value that corresponds to an estimate of the reward 228 that will be provided if response 226 is selected from a cluster of agent responses corresponding to that output node 750.

For example, based on the state indicator 220 the DQN 240 may generate an output value (e.g., 0-1) for each of the output nodes 750 in the output layer 714. The RL agent 106 may then select one of the output nodes 750, based on these output values, using a policy 250. As noted above, in various embodiments the RL agent 106 may utilize different policies 250 during the training phase and the production phase. In FIG. 7, for example, the RL agent 106 includes (or has access to) two different policies—a first policy 250A that may be used during the training phase, and a second policy 250B that may be used during the production phase. For example, during the training phase, the RL agent 106 may use a policy 250A operable to both exploit existing knowledge (e.g., by selecting the action corresponding to the output node 750 with the highest Q-value) and explore new actions (e.g., by selecting an action at random). One such policy 250A that may be used during the training phase is the F-greedy policy in which a random action is selected with a probability of F, where the value of F decreases as training progresses. Note, however, that this is merely one non-limiting example and, in other embodiments, other suitable exploration policies may be used. During the production phase, once the DQN 240 is trained and being utilized by chatbot system 102 to guide a dialogue with a human user, the RL agent 106 may use a policy 250B that selects the action with the highest approximate Q-value (as generated by the DQN 240) when determining the appropriate response 226 to provide to an utterance 212.

In the non-limiting example shown in FIG. 7, output node 750A has a value of 0.1, output node 750B has a value of 0.7, output node 750C has a value of 0.2, and output node 750D has a value of 0.1. In this example, assume that, during a training phase, the output values shown in FIG. 7 are generated by DQN 240 based on the state indicator 220 and that, using policy 250A, output node 750B is selected. In this non-limiting example, the RL agent 106 may generate the action indicator 222 to identify the cluster of agent responses corresponding to output node 750B. In FIG. 7, for instance, in which there are four output nodes 750A-750D, the disclosed techniques may include using one-hot encoding to generate the value for action indicator 222 as [0,1,0,0], indicating that the action corresponding to output node 750B is selected. Note, however, that this embodiment is depicted merely as one non-limiting example. In other embodiments, DQN 240 may include any suitable number of output nodes 750 and any suitable encoding scheme may be used for the action indicator 222. The action indicator 222 may then be used by the response determination module 104 to select a response 226 to provide to the utterance 212, as described in detail above.

In various embodiments, the RL agent 106 then receives a reward 228, either immediately after providing the response 226 or at the end of the conversation. In various embodiments, the RL agent 106 may use the reward 228 to update one or more parameters of the DQN 240. For example, in the embodiment of FIG. 7, RL agent 106 includes training module 720, which, in various embodiments, is operable to train DQN 240 based on the reward 228. For example, in some embodiments the reward 228 may be used to modify the weights (e.g., using stochastic gradient descent or other suitable technique) of the DQN 240 in an effort to maximize the expected value of the total reward provided to the RL agent 106 based on the actions that it selects. In some embodiments, the training module 720 may modify the parameters of the DQN 240 so as to minimize the temporal difference error. Note that, in various embodiments, RL agent 106, including training module 720, may use any of various suitable machine learning platforms or libraries, including Pandas™, scikit-Learn™, TensorFlow™, etc. In one non-limiting embodiment, the disclosed techniques may use the TF-Agents reinforcement learning library to implement one or more of the disclosed techniques.

Note that, in various embodiments, the policy 250B described above may be represented as follows:

$$\pi^*(s) = \text{argmax } Q^*(s,a)$$

where $\pi^*(s)$ is the policy 250B, and assuming a given Q-value function such that:

$$Q^*: \text{State} \times \text{Action} \rightarrow \mathbb{R}$$

In Q-learning, the Q-value function used to calculate the Q-values is based on a Bellman equation, provided as follows:

$$Q^{\pi}(s,a) = r + \gamma Q^{\pi}(s', \pi(s'))$$

As noted above, however, in deep Q-learning, the DQN (e.g., DQN 240) is trained to approximate the Q-value function in a way that obeys the Bellman equation to generate the approximate Q-values. Using these approximate Q-values, the RL agent 106 may utilize a policy 250 to select a cluster of agent responses from which to provide a response 226 to the utterance 212. In various embodiments, during the training phase, the training module 720 tunes the parameters (e.g., the network weights) of the DQN 240 so as to maximize the cumulative reward provided based on the responses 226 chosen using the DQN 240 and the policy 250. In some such embodiments, the cumulative reward may be calculated as follows:

$$R_{t_0} = \sum_{t=t_0}^{\infty} \gamma^{t-t_0} r_t$$

In some embodiments, during the training phase, the disclosed techniques may utilize two networks—a "policy network" in which the weights of the DQN are modified based on the rewards 228 received, and a "target network" that is kept fixed (that is, an DQN for which the weights are not modified) until the policy network reaches a certain threshold, at which point the weighting values from the policy network are copied to the target network. The training phase may then continue in this manner, modifying the policy network until DQN reaches a certain quality threshold (such that the current iteration of the policy network performs better than the current iteration of the target network) and then copying those improved weighting values to the target network. In various embodiments, such an approach may provide stability to the training phase.

In some embodiments, during the initial learning phase, the DQN 240 may be randomly initialized. During training, the DQN 240 may be used to select responses based on the current state of the conversation and the DQN 240 updated based on the reward 228, as described above. In other embodiments, however, rather than randomly initializing the DQN 240 and starting with a random policy 250, the disclosed techniques may instead start with a rule-based policy that is based on the conversation logs 120 for prior conversations. For example, in a conversation log 120 for a prior conversation, it is already known, for each state of the conversation, which response was ultimately selected. In some such embodiments, an initial rule-based policy may add the transition probability from the conversation log as the initial policy for the training phase, which may offer better performance than starting from a randomly initialized policy. Further, in some embodiments, the disclosed techniques may include using experience replay in which the RL agent 106's experiences are randomized so as to avoid memorizing sequences and patterns in the training data.

Note that the embodiment of RL agent 106 of FIG. 7 is provided merely as a non-limiting example and, in other embodiments, other suitable techniques may be used. For example, in some embodiments, policy gradient methods may be used to map an input vector indicative of the current state to a selected output action, which may be advantageous in that such an approach may skip the process of computing the value of each action and instead directly evaluate which action to prefer by modeling State-Value. As will be appreciated by one of skill in the art with the benefit of this disclosure, in such embodiments, the disclosed techniques may utilize gradient ascent to maximize performance. Further, in some embodiments, the disclosed techniques may use actor-critic reinforcement learning techniques to map an input vector indicative of the current state S to a selected output action, which may beneficially learn the policy in a manner similar to the policy gradient method while still leveraging the state and action specific knowledge like Q-learning.

Example Methods

Figure 8:
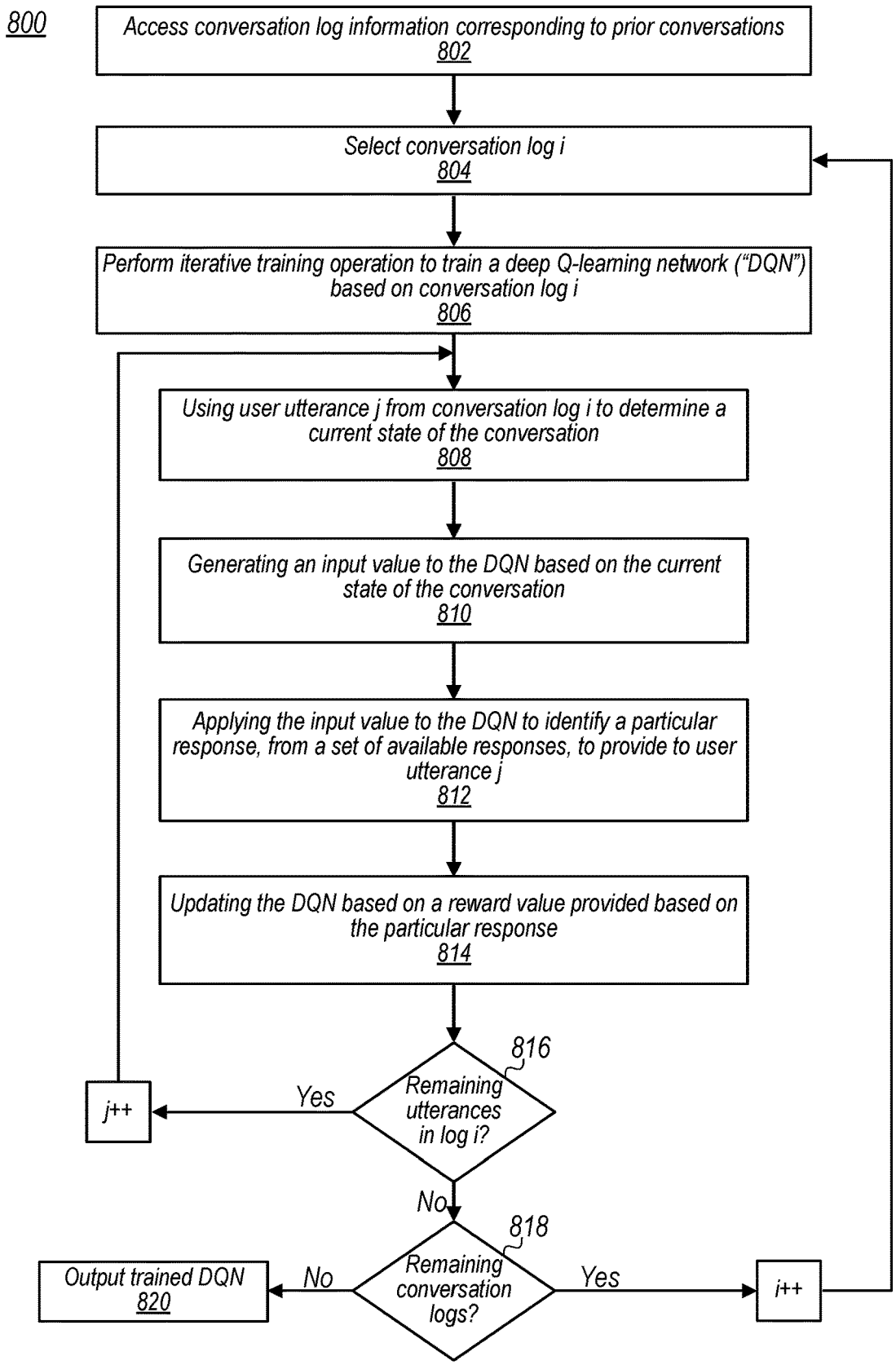
FIG. 8 is a flow diagram illustrating an example method for performing an iterative training operation to train a deep Q-learning network, according to some embodiments.

Referring now to FIG. 8, a flow diagram illustrating an example method 800 for performing an iterative training operation to train a DQN is depicted, according to some embodiments. In various embodiments, method 800 may be performed by chatbot system 102 (e.g., using response determination module 104) of FIG. 1 to train DQN 240 during a reinforcement learning training phase. For example, chatbot system 102 may include (or have access to) a non-transitory, computer-readable medium having program instructions stored thereon that are executable by the chatbot system 102 to cause the operations described with reference to FIG. 8. In FIG. 8, method 800 includes elements 802-820. While these elements are shown in a particular order for ease of understanding, other orders may be used. In various embodiments, some of the method elements may be performed concurrently, in a different order than shown, or may be omitted. Additional method elements may also be performed as desired.

At 802, in the illustrated embodiment, the computer system accesses conversation log information corresponding to prior conversations. For example, as shown above in FIG. 2, user simulation module 202 may access conversation log data store 116, which stores conversation logs 120 corresponding to multiple (and, in some embodiments, numerous) prior conversations. As noted above, in some embodiments these prior conversations were between human users, such as a user and a user-support agent.

At 804, in the illustrated embodiment, the computer system selects a conversation log i, from the conversation log information, corresponding to a prior conversation i. (Note that, as will be appreciated by one of skill in the art, the index variables i and j are used in FIG. 8 and this description to facilitate explanation of the disclosed iterative training operation. Further note that the variable i is used to refer to both a prior conversation (e.g., conversation i) and the corresponding conversation log (e.g., conversation log i) indicative of that conversation i.) At 806, in the illustrated embodiment, the computer system performs an iterative training operation to train a DQN based on conversation log i. As described in detail above with reference to FIG. 7, the DQN 240 utilizes a DNN to estimate optimal Q-values based on the current state of the conversation. In some such embodiments, the DQN 240 may include an input layer 710 used to receive an input value (e.g., a feature vector) indicative of the current state of the conversation i, one or more hidden layers 712, and an output layer 714 that includes a plurality of output nodes 750 corresponding to a plurality of available responses.

In the depicted embodiment, element 806 includes sub-elements 808-816. Note, however, that this embodiment is provided merely as one non-limiting example and, in other embodiments, additional, fewer, or different sub-elements may be included as part of element 806. At 808, in the illustrated embodiment, the computer system uses a user utterance j from conversation log i to determine a current state of the conversation. For example, in some embodiments, determining the current state of the conversation i includes generating a first word-embedding value (e.g., word-embedding vector 214) based on the user utterance j and, using the first word-embedding value, identifying a first cluster of user utterances, from a plurality of clusters of user utterances, for the user utterance. In some embodiments, for instance, the identified first cluster corresponds to an intent of the user utterance j, and generating the first word-embedding value includes embedding one or more tokens in the user utterance j into one or more numerical values that provides a numerical representation of the one or more tokens. Note that, in various embodiments, the current state of the conversation i is based on the intent of the user utterance j, one or more prior intents identified in conversation i, and one or more prior responses provided to the prior utterances in conversation i.

At 810, in the illustrated embodiment, the computer system generates an input value to the DQN based on the current state of the conversation. In some embodiments, the first input value (e.g., state indicator 220) indicates a current intent associated with the user utterance j in prior conversation i, one or more previous intents associated with one or more previous utterances in the prior conversation i (in instances in which j is not the first utterance in conversation i), and one or more previous responses selected, using the DQN, for the one or more previous utterances in the prior conversation i (again, in instances in which utterance j is not the first utterance in conversation i). As noted above, in some embodiments the response determination module 104 utilizes an error model controller 208 that is operable to add noise to the intent indicator 216 indicating the current state of the conversation. For example, in some embodiments, based on the first identifier of the intent of the user utterance j, the error model controller 208 selects a second identifier associated with a second, different intent (e.g., a different cluster of user utterances) for the user utterance j, such that the first input value to the DQN is based on the second identifier associated with the second, different intent for the user utterance. As one non-limiting example, in some embodiments the clusters of user utterances are associated with a corresponding plurality of centroids (e.g., each cluster has a centroid). In such embodiments, the second, different intent may correspond to a second cluster with a second centroid, and selecting the second identifier may include identifying the second centroid associated with the second cluster as the closest centroid, of the plurality of centroids, to a first centroid associated with the first cluster of user utterances. In various embodiments, providing such noise to the input value may provide various technical benefits, such as resulting in a DQN that is more robust when utilized during "live" conversations with human users, as described above.

At 812, in the illustrated embodiment, the computer system applies the input value to the DQN to identify a particular response, from a set of available responses, to provide to user utterance. For example, in some embodiments, by applying the first input value to the input layer of the DQN, the DQN generates (e.g., at the output layer) a plurality of output values at the plurality of output nodes. As explained above, in various embodiments a given output value, for a given output node, is a Q-value (generated by the DQN) for a given response corresponding to the given output node. The computer system may then select a particular output node with the highest Q-value and generate a response identifier value that is indicative of a response associated with that particular output node. Further, in some embodiments, identifying the particular response to provide to user utterance j includes identifying a first cluster of agent responses, from a plurality of clusters of agent responses, based on the response identifier value and select, from the first cluster of agent responses, the particular response to provide to user utterance j. In some embodiments, for example, this may include selecting, as the particular response, an agent response corresponding to the centroid of the first cluster of agent responses.

At 814, in the illustrated embodiment, the computer system updates the DQN based on a reward value provided based on the particular response. In some embodiments, 814 includes determining the first reward value to provide based on the particular response, including by comparing the particular response selected using the DQN to the actual response, specified in the conversation log i, provided by a human agent during the prior conversation i. For example, as described above, in various embodiments the reward determination module 203 may determine a reward 228 based on whether the response 226 selected using the DQN matches (e.g., is in the same cluster of agent responses as) the actual response to user utterance j provided in the conversation log i. Further, in some embodiments, the reward 228 may be based on how close the response 226 was to the actual response specified in the conversation log i. For example, if the response 226 is not from the same cluster of agent responses as the actual response, the reward determination module 203 may use inter-cluster distance to determine the value of the reward 228. As a non-limiting example, if the response 226 was not from the same cluster of agent responses as the actual response but was from the next-closest cluster, the reward determination module 203 may select a reward 228 that is higher than if the response 226 was from a distant cluster (relative to the actual response).

At 816, in the illustrated embodiment, the computer system determines whether there are any remaining utterances in the conversation log i. If so, method 800 includes incrementing the value of j and returning to element 808 such that elements 808-814 may be repeated. If, however, there are no remaining utterances in the conversation log i, method 800 proceeds to element 818, which includes determining whether there are any remaining conversation logs to be processed as part of the training of the DQN. If so, method 800 includes incrementing the value of i and returning to element 804 such that elements 804-816 may be repeated. If, however, there are no remaining conversation logs, method 800 proceeds to element 820, which includes outputting the trained DQN. As described above, once trained the DQN may be used (e.g., by chatbot system 102) to manage a conversation with a human user. For example, in some such embodiments, method 800 includes, subsequent to the iterative training operation, applying a reinforcement learning dialogue policy, using the DQN, to manage a particular conversation with a human user. In some such embodiments, managing the particular conversation includes receiving a particular user utterance provided by the human user, generating a particular input value to the DQN based on a particular current state of the particular conversation with the human user, applying the particular input value to the DQN to identify a particular response, from the plurality of available responses, to provide to the particular user utterance from the human user, and sending an indication of the particular response to a user device of the human user.

Example Computer System

Figure 9:
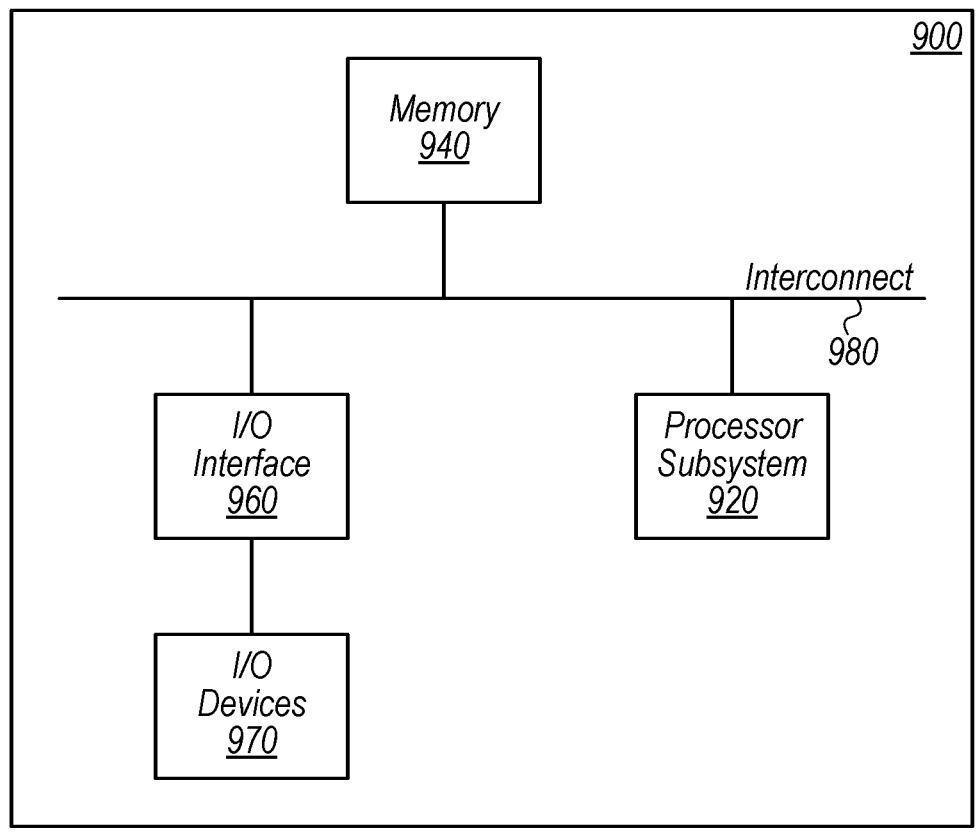
FIG. 9 is a block diagram illustrating an example computer system, according to some embodiments.

Referring now to FIG. 9, a block diagram of an example computer system 900 is depicted, which may implement one or more computer systems, such as chatbot system 102 of FIG. 1, according to various embodiments. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause system 900 perform various operations described herein. System memory 940 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail (e.g., response determination module 104, utterance embedding module 204, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:
    performing, by a computer system, an iterative training operation to train a deep Q-learning network ("DQN") based on conversation log information corresponding to a plurality of prior conversations, wherein the DQN includes:
        an input layer to receive an input value indicative of a current state of a given conversation;
        one or more hidden layers; and
        an output layer that includes a plurality of output nodes corresponding to a plurality of available responses;
    wherein, for a first conversation log corresponding to a first one of the plurality of prior conversations, the iterative training operation includes:
    determining a current state of the first prior conversation based on a first user utterance, wherein determining the current state of the first prior conversation includes, for the first user utterance, identifying a first cluster of user utterances from a plurality of clusters of user utterances, the plurality of clusters of user utterances associated with the plurality of prior conversations partitioned into the plurality of clusters;
        generating a first input value to the DQN based on the current state of the first prior conversation;
        applying the first input value to the DQN to identify a first response, from the plurality of available responses, to provide to the first user utterance; and
        updating the DQN based on a first reward value provided based on the first response; and
    repeating, by the computer system, the iterative training operation using a second conversation log corresponding to a second one of the plurality of prior conversations.

2. The method of claim 1, wherein applying the first input value to the DON to identify the first response to provide to the first user utterance includes:
    based on the first input value, generating, by the DQN, a plurality of output values at the plurality of output nodes in the output layer, wherein a given output value, for a given output node, is a Q-value for a given response that corresponds to the given output node;
    determining that a first output node, corresponding to the first response, has a highest output value of the plurality of output values; and
    generating a response identifier value indicative of the first response.

3. The method of claim 2, wherein, for the first conversation log corresponding to the first prior conversation, the iterative training operation further includes:
    identifying a first cluster of agent responses, from a plurality of clusters of agent responses, based on the response identifier value; and
    selecting the first response, from the first cluster of agent responses, to provide to the first user utterance.

4. The method of claim 1, wherein determining the current state of the first prior conversation further includes:

generating a first word-embedding value based on the first user utterance in the first conversation log; and identifying the first cluster of user utterances, from the plurality of clusters of user utterances, for the first user utterance, based on the first word-embedding value.

5. The method of claim 4, wherein the identified first cluster corresponds to an intent of the first user utterance provided in the first prior conversation, and wherein the generating the first word-embedding value includes embedding one or more tokens in the first user utterance into one or more numerical values that provide a numerical representation of the one or more tokens.

6. The method of claim 5, wherein the current state of the first prior conversation is based on:

the intent of the first user utterance;

one or more prior intents identified in the first prior conversation; and one or more prior responses provided to prior utterances in the first prior conversation.

7. The method of claim 5, wherein, for the first conversation log corresponding to the first prior conversation, the iterative training operation further includes:

based on a first identifier of the intent of the first user utterance, selecting a second identifier associated with a second, different intent for the first user utterance, wherein the first input value to the DQN is based on the second identifier associated with the second, different intent for the first user utterance.

8. The method of claim 1, wherein the first input value indicates:

a current intent associated with the first user utterance in the first prior conversation;

one or more previous intents associated with one or more previous utterances in the first prior conversation; and one or more previous responses selected, using the DQN, for the one or more previous utterances in the first prior conversation.

9. The method of claim 1, wherein, for the first conversation log corresponding to the first prior conversation, the iterative training operation further includes:

determining the first reward value to provide based on the first response, wherein determining the first reward value includes comparing the first response selected using the DQN to an actual first response, specified in the first conversation log, provided by a human agent during the first prior conversation.

10. The method of claim 1, further comprising:

subsequent to the iterative training operation, applying, by the computer system, a reinforcement learning policy, using the DQN, to manage a particular conversation with a human user, wherein applying the reinforcement learning policy includes:

receiving a particular user utterance provided by the human user;

generating a particular input value to the DQN based on a particular current state of the particular conversation with the human user;

applying the particular input value to the DQN to identify a particular response, from the plurality of available responses, to provide to the particular user utterance from the human user; and sending an indication of the particular response to a user device of the human user.

11. A non-transitory, computer-readable medium having instructions stored thereon that are executable by a computer system to perform operations comprising:

performing an iterative training operation to train a DQN based on conversation log information corresponding to a plurality of prior conversations, wherein the DQN includes:

an input layer to receive an input value indicative of a current state of a given conversation;

one or more hidden layers; and an output layer that includes a plurality of output nodes corresponding to a plurality of available responses;

wherein, for a first conversation log corresponding to a first one of the plurality of prior conversations, the iterative training operation includes:

determining a current state of the first prior conversation based on a first user utterance, wherein determining the current state of the first prior conversation includes, for the first user utterance, identifying a first cluster of user utterances from a plurality of clusters of user utterances, the plurality of clusters of user utterances associated with the plurality of prior conversations partitioned into the plurality of clusters;

generating a first input value to the DQN based on the current state of the first prior conversation;

applying the first input value to the DQN to identify a first response, from the plurality of available responses, to provide to the first user utterance; and updating the DQN based on a first reward value provided based on the first response; and repeating the iterative training operation using a second conversation log corresponding to a second one of the plurality of prior conversations.

12. The non-transitory, computer-readable medium of claim 11, wherein applying the first input value to the DON to identify the first response to provide to the first user utterance includes:

based on the first input value, generating, by the DQN, a plurality of output values for the plurality of output nodes in the output layer, wherein a given output value, for a given output node, is a Q-value for a given response that corresponds to the given output node;

determining that a first output node, corresponding to the first response, has a highest output value of the plurality of output values; and generating a response identifier value indicative of the first response.

13. The non-transitory, computer-readable medium of claim 11, wherein determining the current state of the first prior conversation further includes:

generating a first word-embedding value based on the first user utterance in the first conversation log; and identifying the first cluster of user utterances, from the plurality of clusters of user utterances, for the first user utterance, based on the first word-embedding value.

14. A method, comprising:

performing, by a computer system, an iterative training operation to train a DQN based on conversation log information corresponding to a plurality of prior conversations, wherein, for a first conversation log, corresponding to a first one of the plurality of prior conversations, the iterative training operation includes:

identifying a first cluster of user utterances, from a plurality of clusters of user utterances, for a first user utterance from the first conversation log, wherein the plurality of clusters of user utterances is associated with the plurality of prior conversations partitioned into the plurality of clusters;

generating a first input value based on a current state of the first prior conversation, wherein the current state of the first prior conversation is based on the identified first cluster of user utterances for the first user utterance;

applying the first input value to the DQN to generate a plurality of output values corresponding to a plurality of available responses to the first user utterance;

based on the plurality of output values, selecting a first response, from the plurality of available responses, to provide to the first user utterance; and updating the DQN based on a reward value provided for the first response; and repeating, by the computer system, the iterative training operation using a second conversation log corresponding to a second one of the plurality of prior conversations.

15. The method of claim 14, wherein, for the first conversation log, the iterative training operation further includes:

generating a first word-embedding value based on the first user utterance from the first conversation log, wherein the identifying the first cluster of user utterances for the first user utterance is based on the first word-embedding value.

16. The method of claim 15, wherein the current state of the first prior conversation is further based on:

one or more prior intents identified in the first prior conversation; and one or more prior responses provided to prior utterances in the first prior conversation.

17. The method of claim 14, wherein, for the first conversation log corresponding to the first prior conversation, the iterative training operation further includes:

based on a first identifier of an intent of the first user utterance, selecting a second identifier associated with a second, different intent for the first user utterance, wherein the first input value to the DQN is based on the second identifier associated with the second, different intent for the first user utterance.

18. The method of claim 17, wherein the plurality of clusters of user utterances are associated with a plurality of centroids, wherein the second, different intent corresponds to a second cluster of the plurality of clusters of user utterances, and wherein selecting the second identifier includes:

identifying a second centroid associated with the second cluster as a closest, of the plurality of centroids, to a first centroid associated with the first cluster.

19. The non-transitory, computer-readable medium of claim 11, wherein the iterative training operation further includes:

partitioning the plurality of prior conversations into the plurality of clusters;

generating an intent indicator indicative of a cluster associated with an intent of the first user utterance; and introducing an error into the intent indicator.

20. The non-transitory, computer-readable medium of claim 11, wherein the iterative training operation further includes:

generating an intent indicator associated with an intent of the first user utterance, the intent indicator identifying a cluster of the plurality of clusters associated with the intent of the first user utterance.

* * * * *

UNITED STATES PATENT AND TRADEMARK OFFICE
CERTIFICATE OF CORRECTION

| | |
|---|---|
| PATENT NO. | : 12,271,703 B2 |
| APPLICATION NO. | : 17/489356 |
| DATED | : April 8, 2025 |
| INVENTOR(S) | : Rajesh Virupaksha Munavalli |

It is certified that error appears in the above-identified patent and that said Letters Patent is hereby corrected as shown below:

In the Claims

In Column 26 (Claim 2), Line 46, please delete "DON" and insert -- DQN --.

In Column 28 (Claim 12), Line 34, please delete "DON" and insert -- DQN --.

Signed and Sealed this
Sixth Day of May, 2025

Coke Morgan Stewart
*Acting Director of the United States Patent and Trademark Office*